(12) United States Patent
Wallace

(10) Patent No.: US 10,189,733 B2
(45) Date of Patent: Jan. 29, 2019

(54) HEATING SYSTEM FOR DESALINATION

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 382 days.

(21) Appl. No.: 13/965,540

(22) Filed: Aug. 13, 2013

(65) Prior Publication Data

US 2014/0042061 A1 Feb. 13, 2014

Related U.S. Application Data (60) Provisional application No. 61/682,590, filed on Aug. 13, 2012.

(51) Int. Cl.
| | |
|---|---|
| *C02F 9/00* | (2006.01) |
| *C05F 7/00* | (2006.01) |
| *C02F 1/00* | (2006.01) |
| *C02F 1/20* | (2006.01) |
| *C02F 1/28* | (2006.01) |
| *C02F 1/44* | (2006.01) |

(Continued)

(52) U.S. Cl.
CPC ............... *C02F 9/00* (2013.01); *C05F 7/00* (2013.01); *C02F 1/004* (2013.01); *C02F 1/20* (2013.01); *C02F 1/28* (2013.01); *C02F 1/441* (2013.01); *C02F 1/442* (2013.01); *C02F 1/444* (2013.01); *C02F 1/4693* (2013.01); *C02F 1/52* (2013.01); *C02F 1/5263* (2013.01); *C02F 1/66* (2013.01); *C02F 2103/06* (2013.01); *C02F 2103/08* (2013.01); *C02F 2209/02* (2013.01); *C02F 2303/24* (2013.01); *Y02A 20/131* (2018.01); *Y02A 20/134* (2018.01); *Y02A 40/213* (2018.01)

(58) Field of Classification Search
None
See application file for complete search history.

(56) References Cited

U.S. PATENT DOCUMENTS 3,724,229 A * 4/1973 Seliber ............................ 62/50.3
3,763,014 A * 10/1973 Barba et al. ................... 202/173

(Continued)

FOREIGN PATENT DOCUMENTS

WO 2007094659 A1 8/2007

OTHER PUBLICATIONS

McDonald, M. R., McClintock, J. B., Amsler, C. D., Rittschoff, D., Angus, R. A., Orihuela, B. & Lutostankski, K., "Effects of Ocean Acidification Over the Life History of the Barnacle *Amphibalanus amphitrite*," Marine Ecology Progress Series 385:179-187 (2009).

(Continued)

*Primary Examiner* — Richard C Gurtowski
(74) *Attorney, Agent, or Firm* — Fletcher Yoder, P.C.

(57) ABSTRACT

A heating system for desalination. One system includes a desalination system configured to receive a brine and to produce desalinated water from the brine. The system also includes a power production system having an engine configured to provide power to the desalination system. The power production system does not include combined cycle power production. The system also includes a heating system driven by the power production system and configured to provide heat for heating the brine.

19 Claims, 4 Drawing Sheets

(51) Int. Cl.

| | |
|---|---|
| C02F 1/469 | (2006.01) |
| C02F 1/52 | (2006.01) |
| C02F 1/66 | (2006.01) |
| C02F 103/06 | (2006.01) |
| C02F 103/08 | (2006.01) |

(56) References Cited

U.S. PATENT DOCUMENTS

| | | | |
|---|---|---|---|
| 4,127,235 A | 11/1978 | Klaile et al. | |
| 4,163,046 A | 7/1979 | Subramanian et al. | |
| 4,298,442 A | 11/1981 | Giuffrida | |
| 4,315,402 A * | 2/1982 | Sadhukhan | 60/641.3 |
| 4,381,232 A | 4/1983 | Brown | |
| 4,405,463 A | 9/1983 | Jost et al. | |
| 4,436,429 A | 3/1984 | Strong et al. | |
| 4,725,425 A | 2/1988 | Lesher et al. | |
| 4,752,389 A * | 6/1988 | Burrows | 210/181 |
| 4,806,244 A * | 2/1989 | Guilhem | B01D 61/025 210/638 |
| 5,221,528 A | 6/1993 | Jongema | |
| 5,250,185 A | 10/1993 | Tao et al. | |
| 5,366,514 A | 11/1994 | Becnel, Jr. et al. | |
| 5,417,491 A | 5/1995 | Hornung et al. | |
| 5,765,945 A | 6/1998 | Palmer | |
| 5,858,240 A | 1/1999 | Twardowski et al. | |
| 5,925,255 A | 7/1999 | Mukhopadhyay | |
| 6,030,535 A | 2/2000 | Hayashi et al. | |
| 6,036,740 A | 3/2000 | Miller et al. | |
| 6,139,740 A * | 10/2000 | Oklejas | 210/321.66 |
| 6,183,644 B1 | 2/2001 | Adams et al. | |
| 6,254,734 B1 * | 7/2001 | Sephton | 203/2 |
| 6,461,491 B1 | 10/2002 | Hryn et al. | |
| 6,482,305 B1 | 11/2002 | Mani | |
| 6,716,355 B1 * | 4/2004 | Hanemaaijer et al. | 210/640 |
| 7,083,730 B2 | 8/2006 | Davis | |
| 7,147,361 B2 | 12/2006 | Cecala et al. | |
| 7,392,848 B1 | 7/2008 | Bader | |
| 7,459,088 B2 | 12/2008 | Davis | |
| 7,501,064 B2 | 3/2009 | Schmidt et al. | |
| 7,595,001 B2 | 9/2009 | Arakel et al. | |
| 7,861,955 B2 | 1/2011 | Tracy et al. | |
| 2006/0178782 A1 * | 8/2006 | Pechtl et al. | 700/286 |
| 2007/0189945 A1 | 8/2007 | Kopp et al. | |
| 2007/0267874 A1 * | 11/2007 | Taylor et al. | 290/55 |
| 2008/0185340 A1 | 8/2008 | Bargeman et al. | |
| 2008/0237123 A1 | 10/2008 | Marston | |
| 2009/0127360 A1 | 5/2009 | Tracy et al. | |
| 2010/0163471 A1 | 7/2010 | Elyanow et al. | |
| 2011/0147195 A1 * | 6/2011 | Shapiro et al. | 203/10 |
| 2011/0198285 A1 | 8/2011 | Wallace | |
| 2011/0289846 A1 | 12/2011 | Shaw et al. | |
| 2011/0303607 A1 | 12/2011 | Vora et al. | |

OTHER PUBLICATIONS

Markus Busch, William E. Mickols, Steve Jons, Jorge Redondo, Jean De Witte, "Boron Removal in Sea Water Desalination," International Desalination Association, BAH03-039 (2003).

NRS Engineering Water Solutions, "Final Pilot Study Report—Texas Seawater Desalination Demonstration Project," (Oct. 2008).

Collin Green "Using Gypsum for the Treatment of Mine Water," Department of Chemical and Metallurgical Engineering, Faculty of Natural Sciences, Technikon Pretoria (Dec. 2003).

Stephen R. Grattan "Irrigation Water Salinity and Crop Production," University of California, Davis—Agriculture and Natural Resources, ANR Publication 8066 (2002).

Ittai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).

DOW Water Solutions, "Filmtec™ Reverse Osmosis Membranes," Technical Manual, Form No. 609-00071; (2010) pp. 1-180.

DOW Water Solutions, "DOWTM Filmtec™ Membranes—DOW™ Filmtec™ SW30XLE-440i Seawater Reverse Osmosis Element with iLEC Interlocking Endcaps," Product Information. Form No. 609-03003-1109; (2010) pp. 1-2.

DOW Water Solutions, "DOW™ Filmtec™ Membranes—DOW™ Filmtec™ SW30ULE-440i Seawater Reverse Osmosis Element with ILEC™ Interlocking Endcaps," Product Information, Form No. 609-03004-1109; (2010) pp. 1-2.

DOW Water Solutions, "Filmtec™ Membranes—Filmtec™ XLE-440 Extra Low Energy RO Element," Product Information. Form No. 609-00245-0606; (2010) pp. 1-2.

DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.

FAO Corporate Document Repository, Agriculture and Consumer Protection, "Water Quality for Agriculture"; http://www.fao.org/DOCREP/003/T0234E/T0234E05.htm (Feb. 10, 2010) pp. 1-15.

Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.

GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.

GE Power & Water—Water & Process Technologies, "HERO" (2010) pp. 1-2.

ICL, "Harnessing Nature Creating Value," 3rd Annual NASDAQ-TASE Israeli Investor Conference, New York (Sep. 18, 2008) pp. 1-47.

Applied Membranes, Inc., "Water Treatment Guide—Temperature Correction Factor for Reverse Osmosis Membranes," (2007) pp. 1-2.

Nitto Denko and Hydranautics, "Chemical Pretreatment for RO and NF," Technical Application Bulletin No. 111, Revision C (Dec. 2008) pp. 1-16.

Chemical Processign.com, "To Avoid Silica-Scale Problems in Cooling Towers, Plant Personnel Tum to Unconventional Methods," Water Treatment's Gordion Knot; http://www.chemicalprocessing.com/articles/2003/235.html?page=print; (2003) pp. 1-9.

"Desalination: A National Perspective," Committee on Advancing Desalination Technology, National Research Council , The National Academies—Advisers to the Nation on Science, Engineering, and Medicine (2008) pp. 1-255.

Public Health and the Environment World Health Organization, "Desalination for Safe Water Supply—Guidance for the Health and Environmental Aspects Applicable to Desalination," Geneva (2007) pp. 1-173.

Gerald L. Mackie and Barb Crosbie, "Zebra Mussel Biofouling Control in Cottage and Other Small Volume Water Systems," The Georgian Bay Association (1999) pp. 1-87.

Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem, vol. 13, No. 3, (2007) 452-456.

Epa Selenium Purification_Scandium (1998) pp. 1-62.

Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.

Reclamation—Managing Water in the West, Desalination and Water Purification Research and Development Program Report No. 135, Pilot Testing of Zero-Discharge Seawater Desalination—Application to Selenium Removal from Irrigation Drainage, U.S. Department of the Interior Bureau of Reclamation, Apr. 2008, pp. 1-37.

Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.

T. Masuzawa, "Impurities Contained Inside the Crystals of Solar and Vacuum Evaporated Salts," Fifth International Symposium on (56) References Cited

OTHER PUBLICATIONS

Salt—Northern Ohio Geological Society, May 29-Jun. 1, 1979, Hamburg, Germany, pp. 463-473.
Seung Joon Kim, Young Geun Lee, Sanghoun Oh, Yun Seok Lee, Young Mi Kim, Moon Gu Jeon, Sangho Lee, In S. Kim, Joon Ha Kim, "Energy saving methodology for the SWRO desalination process: controrl of operating temperature and pressure," Desalination 249 (2009) 260-270.
Peter Eriksson, Markus Kyburz, Wil Pergande, "NF membrane characteristics and evaluation for sea water processing applications," Desalination 184 (2005) 281-294.
EPA Selenium Purification (1991) pp. 1-8.

\* cited by examiner

HEATING SYSTEM FOR DESALINATION

CROSS REFERENCE TO RELATED APPLICATIONS

This application benefits from the priority of U.S. Provisional Patent Application No. 61/682,590, entitled "Heating System for Desalination" filed Aug. 13, 2012, which is hereby incorporated by reference in its entirety.

The following applications are also incorporated by reference in their entirety:

U.S. Provisional Patent Application No. 61/682,585, entitled "System for Removing Minerals from a Brine Using Electrodialysis," filed Aug. 13, 2012, U.S. Provisional Patent Application No. 61/682,596, entitled "System for Removing High Purity Salt from a Brine" filed Aug. 13, 2012, U.S. Provisional Patent Application No. 61/682,603, entitled "System for Rinsing Electrodialysis Electrodes" filed Aug. 13, 2012, U.S. Provisional Patent Application No. 61/682,609, entitled "System for Removing Selenium from a Feed Stream" filed Aug. 13, 2012, and U.S. Provisional Patent Application No. 61/682,612, entitled "System for Producing a Gypsum Slurry for Irrigation" filed Aug. 13, 2012.

BACKGROUND

The subject matter disclosed herein relates generally to desalination and, more particularly, a heating system for heating a brine before desalination of the brine.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, the need for innovative technologies and alternative water supplies for both drinking water and agriculture is important. One method for obtaining an alternative source of potable water uses desalination systems to produce the potable water.

The desalination process involves the removal of salts from seawater, agricultural run-off water, and/or brackish ground water brines to produce potable water. Membrane-based desalination may use an assortment of filtration methods, such as nanofiltration and reverse osmosis, to separate the raw stream into a desalinated water stream and a tailing stream. The tailing streams may contain various salts and other materials left over after the desalination process. Further, in certain desalination systems, it may be useful to heat the feed brine stream provided to the desalination facility (e.g., to optimize desalination, to facilitate reduced degradation of the desalination system components, etc.).

In certain configuration, warm feed brine streams may improve the capacity and/or the efficiency of membrane-based desalination equipment. Indeed, temperature optimization may both significantly reduce energy consumption and increase the permeate flux of such membrane-based systems. Furthermore, the temperature of the feed brine may be controlled for high efficiency membrane-based systems because excessive temperatures may increase maintenance and/or replacement costs.

BRIEF DESCRIPTION

In one embodiment, a system includes a desalination system configured to receive a brine and to produce desalinated water from the brine. The system also includes a power production system having an engine configured to provide power to the desalination system. The power production system does not include combined cycle power production. The system also includes a heating system driven by the power production system and configured to provide heat for heating the brine.

In another embodiment, a system includes a desalination system configured to receive a brine and to produce desalinated water from the brine. The system also includes a temperature control system having a first heat exchanger configured to heat the brine using the desalinated water before the brine is provided to the desalination system. The temperature control system is configured to control a temperature of the brine at least partly by selectively directing the desalinated water to bypass the first heat exchanger.

In another embodiment, a system includes a desalination system configured to receive a brine and to produce desalinated water from the brine. The system also includes a temperature control system configured to heat the brine using the desalinated water before the brine is provided to the desalination system. A first flow rate of the desalinated water is greater than or equal to approximately 80 percent of a second flow rate of the brine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
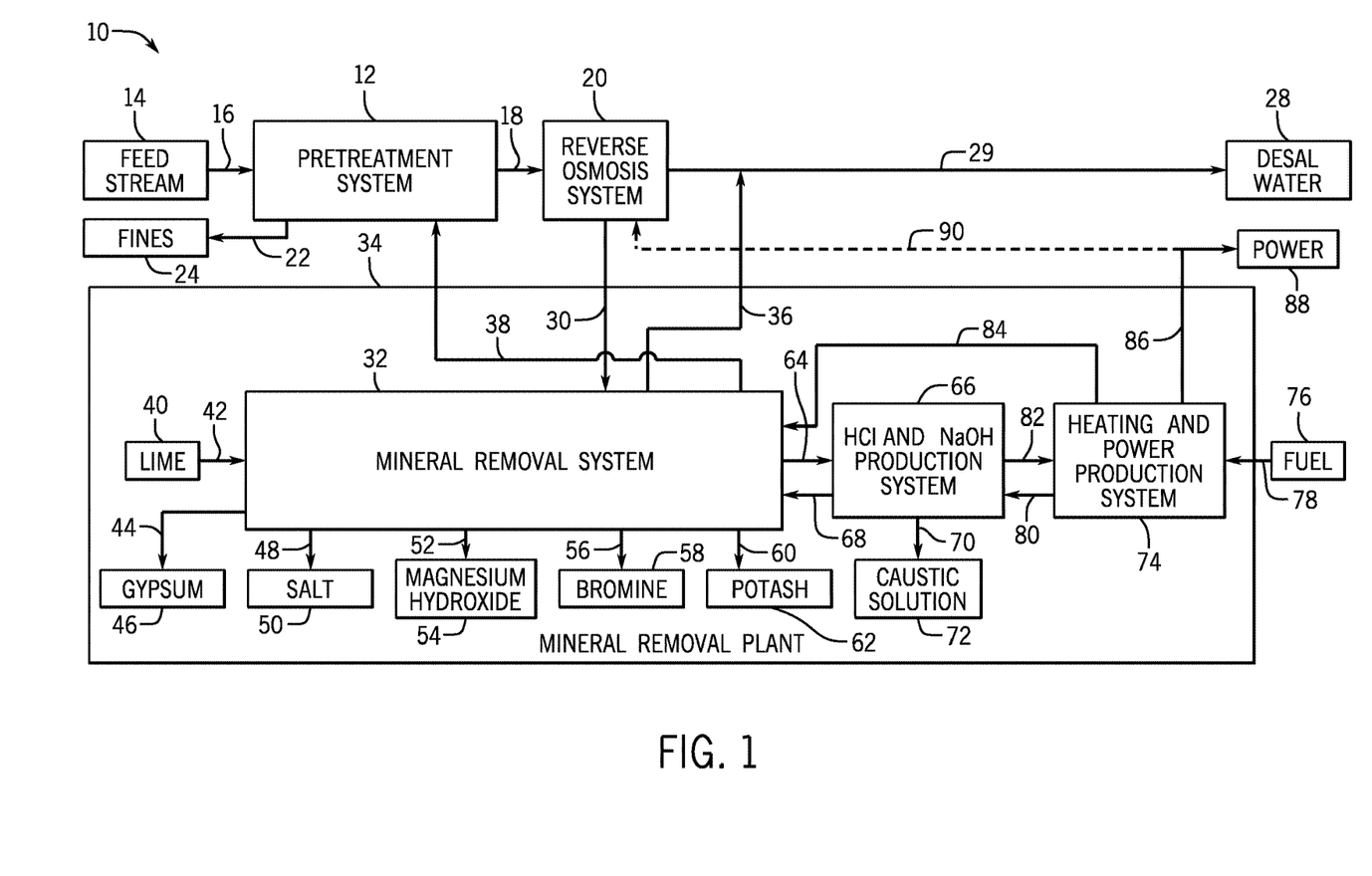
FIG. 1 is a block diagram of an embodiment of a water processing system, in accordance with aspects of the present disclosure.

FIG. 1 is a block diagram of an embodiment of a water processing system 10. The water processing system 10 is used to produce desalinated water from a feed stream and to remove minerals from the feed stream. For example, the water processing system 10 may be used to produce high purity agricultural grade gypsum (e.g., approximately greater than 97 wt % gypsum on a dry basis), industrial grade caustic (e.g., approximately greater than 97 wt % NaOH on a dry basis), industrial grade magnesium hydroxide (e.g., approximately greater than 98 wt % MgO on an ignited basis, or on an ignited oxide basis) suitable for industrial magnesia refractory, industrial grade sodium chloride (e.g., approximately greater than 99.9 wt % NaCl on a dry basis), and/or desalinated water (e.g., approximately less than 1000 wppm total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14 as an input 16. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca+Mg, and/or approximately 0.01 to 0.30 g/l $SiO_2$. Furthermore, in certain embodiments, the feed stream 14 may have a pH range between approximately 5 and 9. Specifically, the feed stream 14 may have a pH of approximately 8.

The pretreatment system 12 receives the feed stream 14 and removes solid materials (e.g., fines) from the feed stream 14. The pretreatment system 12 provides the pretreated feed stream 14 as a first output 18 to a reverse osmosis (RO) system 20. Moreover, the pretreatment system 12 provides a second output 22 that contains fines 24, such as iron (Fe) and manganese (Mn). The RO system 20 receives the pretreated feed stream 14 and produces desalinated water 28 as a first output 29. In certain embodiments, the desalinated water 28 may include $SiO_2$. Moreover, the desalinated water 28 may have a pH of approximately 7.5. Furthermore, the RO system 20 provides a brine stream as a second output 30 to a mineral removal system 32. In certain embodiments, the desalinated water 28 may be approximately 70 to 90 percent of the output from the RO system 20, and the brine stream may be approximately 10 to 30 percent of the output from the RO system 20. Specifically, in some embodiments, the desalinated water 28 may be approximately 80 percent of the output from the RO system 20, and the brine stream may be approximately 20 percent of the output from the RO system 20. As may be appreciated, while the illustrated embodiment uses the RO system 20, other embodiments may use NF in place of RO.

The mineral removal system 32 is part of a mineral removal plant 34. The mineral removal plant 34 is configured to remove minerals, elements, and/or compounds from the brine stream. As may be appreciated, the brine stream may be provided to the mineral removal plant 34 from any suitable source and/or system. In certain embodiments, the brine stream may include substantial amounts of sodium chloride, sulfate, calcium, and/or magnesium. The mineral removal system 32 may provide one or more outputs 36 that include desalinated water (which may contain silicon dioxide). Furthermore, the one or more outputs 36 may include a disinfectant and/or oxidant. The disinfectant and/or oxidant may be provided to the pretreatment system 12 via an output 38.

A lime based material 40 (e.g., lime, quick lime, dolomitic lime, etc.) may be provided to an input 42 of the mineral removal system 32 to facilitate mineral removal from the brine stream. The mineral removal system 32 may be configured to remove any suitable mineral, elements, and/or compounds from the brine stream. For example, the mineral removal system 32 may provide a first output 44 including gypsum 46 (e.g., agricultural grade gypsum), a second output 48 including salt 50 (e.g., industrial grade sodium chloride), a third output 52 including magnesium hydroxide 54 (e.g., industrial grade magnesium hydroxide), a fourth output 56 including bromine 58, and/or a fifth output 60 including potash 62.

In certain embodiments, the mineral removal system 32 may provide one or more outputs 64 to a hydrochloric acid (HCl) and sodium hydroxide (NaOH) production system 66. Furthermore, the mineral removal system 32 may receive one or more inputs 68 from the HCl and NaOH production system 66. For example, the mineral removal system 32 may provide a sodium chloride brine to the HCl and NaOH production system 66. Moreover, the mineral removal system 32 may receive HCl, caustic, and/or NaOH produced by the HCl and NaOH production system 66. In certain embodiments, the HCl and NaOH production system 66 may provide an output 72 of a caustic solution 70 (e.g., NaOH) or HCl solution that is not used by the mineral removal system 32 (e.g., produced to be sold).

The mineral removal plant 34 also includes a heating and power production system 74. In certain embodiments, the heating and power production system 74 may include a natural gas engine and/or a boiler. The heating and power production system 74 is configured to receive a fuel 76 at an input 78. The fuel 76 may be any suitable fuel, such as natural gas. The heating and power production system 74 is configured to provide one or more outputs 80 to the HCl and NaOH production system 66. The one or more outputs 80 may include power, steam, hot water, any suitable heated fluid, and so forth. Moreover, the heating and power production system 74 is configured to receive a cooled fluid (such as water) via one or more inputs 82. As illustrated, the heating and power production system 74 is configured to provide power to the mineral removal system 32 via a first output 84. Moreover, the heating and power production system 74 includes a second output 86 configured to provide power 88 to another system and/or to provide a power output 90 to the RO system 20.

Figure 2:
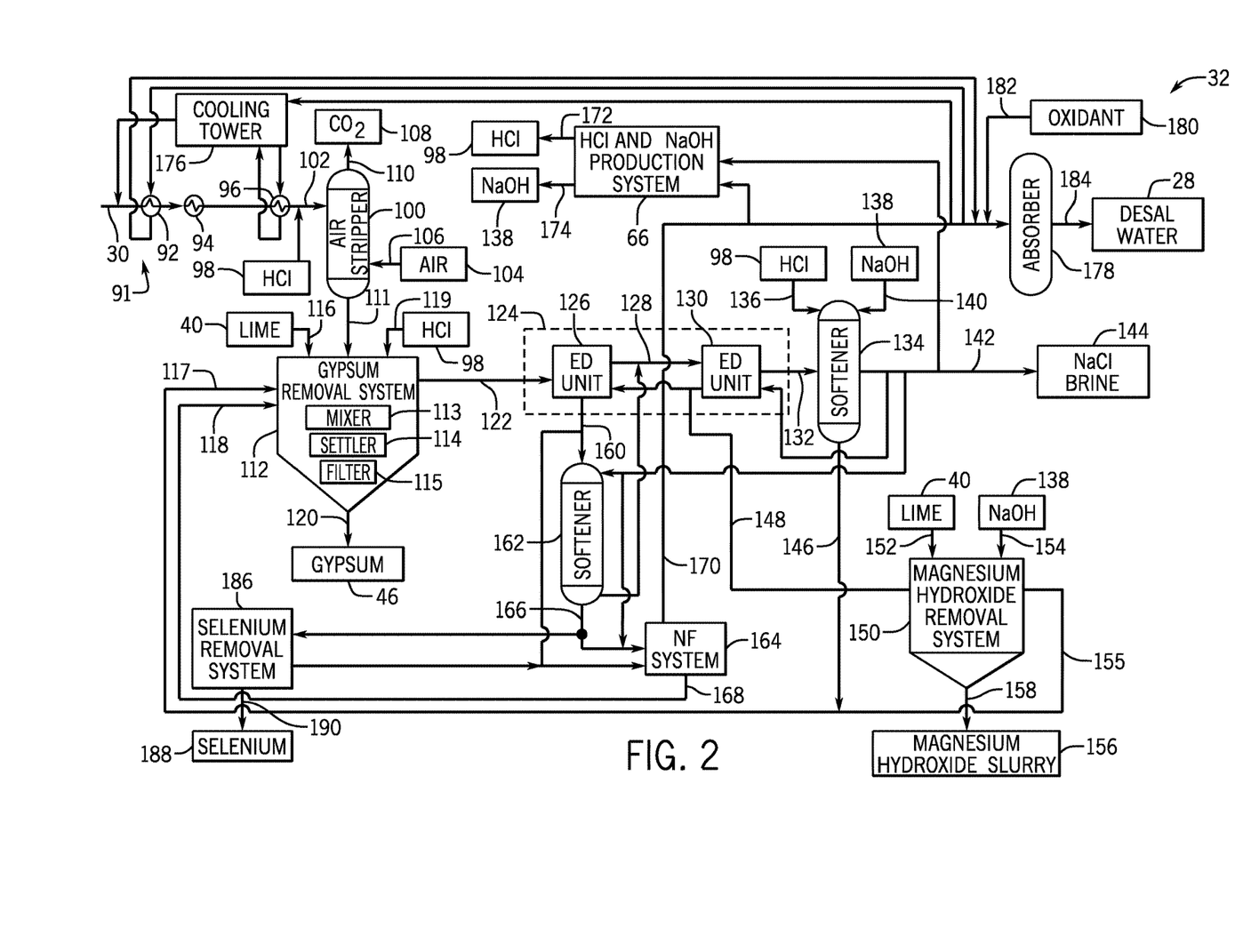
FIG. 2 is a block diagram of an embodiment of a mineral removal system, in accordance with aspects of the present disclosure.

FIG. 2 is a block diagram of an embodiment of the mineral removal system 32. As previously described, the mineral removal system 32 receives at an input the brine stream from the output 30 of the RO system 20. As may be appreciated, the brine stream may contain various elements and/or compounds. For example, the brine stream may contain NaCl, $SO_4$, Ca, Mg, and/or $SiO_2$. In certain embodiments, the brine stream may contain approximately 3.0 to 8.0 g/l NaCl, approximately 3,000 to 8,000 weight parts per million (wppm) $SO_4$, approximately 100 to 400 wppm Mg, approximately 200 to 600 wppm Ca, and/or approximately 50 to 200 wppm $SiO_2$. Furthermore, in certain embodiments, the brine stream may have a pH range between approximately 4 and 8. Specifically, the brine stream may have a pH of approximately 6. In the illustrated embodiment, a temperature control system 91 is used to control heating of the brine stream. Moreover, the temperature control system 91 includes a first heat exchanger 92, a second heat exchanger 94, and a third heat exchanger 96 to aid in controlling the temperature of the brine stream.

The brine stream is mixed with HCl 98 to convert bicarbonate ($HCO_3^-$) and carbonate ($CO_3^{2-}$) in the brine stream to $CO_2$, thereby decreasing the pH to less than 4. The acidified brine stream is routed to an air stripper 100 via a first input 102. The air stripper 100 uses air 104 provided to a second input 106 of the air stripper 100 to facilitate removal of the $CO_2$ 108 from the brine stream via a first output 110. In certain embodiments, multiple stages are used in the air stripper 100 to enable a low residual (e.g., less than approximately 2 ppm). As may be appreciated, a low $CO_2$ residual may inhibit carbonate reformation and scaling when the pH of the brine stream is increased during the various downstream brine treatment steps.

The $CO_2$ stripped brine stream is provided via a second output 111 of the air stripper 100 to a gypsum removal system 112. The gypsum removal system 112 may include a mixer 113, a settler 114, and a filter 115 to facilitate removal of the gypsum 46 from the brine stream (e.g., feed stream). Accordingly, within the mixer 113, the $CO_2$ stripped brine stream is mixed with: the lime based material 40 (e.g., lime, quick lime, dolomitic lime, etc.) received by a first input 116 of the gypsum removal system 112, recycled concentrated calcium chloride ($CaCl_2$) brine (e.g., such as a brine containing approximately 4 to 25 wt % $CaCl_2$) received by a second input 117, and recycled NF non-permeate (e.g., a sodium sulfate ($Na_2SO_4$) rich brine) received by a third input 118. In certain embodiments, such as embodiments with feed brines having a lower $Na_2SO_4$ content, the second output 111 may bypass the gypsum removal system 112. Accordingly, only the second input 117 and the third input 118 may be provided to the gypsum removal system 112. Furthermore, in such an embodiment, the second output 111 may be mixed with a brine output stream 122 from the gypsum removal system 112.

HCl 98 may be added to the gypsum removal system 112 via a fourth input 119. In certain embodiments, the lime based material 40 and the HCl 98 may be pre-mixed into the recycle calcium chloride brine stream to increase calcium content in the mixer 113 of the gypsum removal system 112 and/or in the mineral removal system 32. For example, this may be beneficial when the $SO_4$ to (Mg+Ca) molar ratio is greater than approximately 1.0 since it provides supplemental calcium to allow substantial (e.g., complete, nearly complete, etc.) sulfate removal as gypsum 46. In other embodiments, commercial calcium chloride brine, flakes, or pellets may be added to the mixer 113 of the gypsum removal system 112 when the brine stream is deficient in calcium. Furthermore, in certain embodiments, HCl 98 and limestone may also be added to the recycle calcium chloride brine and the brine stripped in a second air stripper to remove the residual $CO_2$. As may be appreciated, limestone may be procured at a lower cost than lime; however, the second air stripper may be necessitated by the use of the limestone.

The overall molar ratio of Ca to $SO_4$ in the brine stream entering the gypsum removal system 112 may be controlled to approximately 0.8 to 1.2 by calcium addition to the mixer 113 (e.g., HCl 98 plus the lime based material 40, $CaCl_2$, and/or HCl 98 plus limestone with additional air stripping) as discussed above, and/or by removing a portion of the concentrated $CaCl_2$ brine as a byproduct. Recycled gypsum 46 seed crystals are added to the mixture within the mixer 113 of the gypsum removal system 112. The calcium in the concentrated $CaCl_2$ brine stream reacts with the sulfate in the brine stream received by the gypsum removal system 112 from the air stripper 100 and the recycle NF non-permeate to precipitate gypsum 46. In certain embodiments, approximately 50% to 70% of the sulfate is removed from the brine stream. The presence of gypsum 46 seed crystals in the mixer 113 (e.g., a turbulent mixer) at neutral pH (e.g., a pH of approximately 6 to 8) may facilitate gypsum 46 precipitation kinetics, thereby enabling rapid gypsum precipitation. At the mixer 113 effluent the solution reaches near saturation conditions (e.g., slightly supersaturated) with respect to gypsum 46 and the slurry is pumped to the settler 114.

In addition to gypsum 46 precipitation, insoluble calcium fluoride ($CaF_2$) also precipitates in the mixer 113 thereby removing a substantial portion of the fluoride from the stripped brine stream; thereby inhibiting fluoride scaling in the electrodialysis (ED) system. In the settler 114 the gypsum 46 crystals settle and the saturated near solids free solution is decanted off, and filtered by the filter 115 (e.g., a sand filter, a microfilter, an ultrafilter, and so forth) to remove residual gypsum 46 particles. A small amount of softened salt brine is recycled to the settler 114 overflow to increase gypsum 46 solubility and desaturate the brine stream, thereby inhibiting scaling in the filter 115 and other downstream units. The settler 114 bottoms may be routed to a hydroclone and filter to wash (e.g., with desalinated product water) and concentrate the gypsum 46 into a saleable washed filter cake. In certain embodiments, the filter cake may include approximately 70 to 100 wt % gypsum 46. Specifically, the filter cake may include approximately 90 wt % gypsum 46. Thus, gypsum 46 is provided as an output 120 from the gypsum removal system 112. The fine solids overflow stream from the hydroclone is recycled to the mixer 113 as seed crystals. The filtrate from the filter 115 is recycled to the settler 114.

The gypsum removal system 112 may remove approximately 60 to 75% of the gypsum received from the second output 111 and produces the brine stream output 122 having a reduced amount of gypsum relative to the second output 111. For example, the brine stream output 122 (e.g., recycle brine stream output) may contain less than approximately 5 g/l gypsum, while the second output 111 may contain approximately 12 to 20 g/l gypsum. Furthermore, in certain embodiments, the brine stream output 122 may contain approximately 5.0 to 15.0 g/l NaCl and/or approximately 1,000 to 3,000 wppm $SO_4$. Moreover, the brine stream output 122 may have a pH of approximately 6. The brine stream output 122 is provided to an electrodialysis (ED) system 124. Furthermore, as illustrated, the gypsum removal system 112 is fluidly coupled to the ED system 124. In certain embodiments, a guard cartridge filter may be disposed between the brine stream output 122 and the ED system 124 to filter the brine stream output 122 thereby blocking gypsum scale from passing to the ED system 124. The ED system 124 is configured to receive the brine stream output 122 from the gypsum removal system 112, to produce a substantially sulfate hardness (e.g., Ba, Sr, Ca) free sodium sulfate solution, to produce a sodium chloride solution, and to produce a mineral solution. In the illustrated embodiment, the ED system 124 includes a first ED unit 126 that provides an intermediate output 128 to a second ED unit 130. In certain embodiments, the intermediate output 128 may include approximately 70 to 120 g/l total dissolved solids (TDS).

The first ED unit 126 (e.g., mixed chloride extraction ED) extracts a substantial portion (e.g., approximately 65% to 80%) of the magnesium chloride, calcium chloride, and sodium chloride from the brine stream output 122 using non-permselective cationic membranes and monovalent permselective anionic membranes to produce a concentrated (e.g., approximately 3 to 25 wt %) barium chloride, strontium chloride, magnesium chloride, calcium chloride, sodium chloride brine that is substantially sulfate free that is provided via the intermediate output 128 to the second ED unit 130. At a pH of approximately 6 both boric acid and silica are in a non-ionic form and thus are not extracted by the ED into the intermediate output 128 having the concentrated brine stream. As may be appreciated, barium (Ba), strontium (Sr), magnesium, and calcium chlorides are preferentially extracted versus sodium chloride through non-permselective cation membranes. Thus, a diluate brine output 160 from the first ED unit 126 is a dilute $Na_2SO_4$ brine with reduced barium, strontium, calcium, and magnesium content and very low chloride content (e.g., a substantially sulfate hardness free sodium sulfate solution). For example, the substantially sulfate hardness free sodium sulfate solution may include less than approximately 200 mg/l (Ca+Sr+Ba) and/or approximately 3 to 5 g/l sulfate.

In certain embodiments, the first ED unit 126 may include a two-stage ED configuration for mixed chloride extraction ED. For example, a first stage may extract approximately 70-90% of the mixed chlorides as a low sulfate, high concentration product concentrate. Furthermore, a second stage may be fed by the first stage diluate and the brine stream output 122. Residual mixed chlorides in the first stage diluate may be extracted into the brine stream output 122, which may be fed to the first stage. As may be appreciated, the two-stage design may increase ED power consumption and size, however, the two-stage design may facilitate a sharper separation and higher recoveries of sulfate in relation to the diluate product and chloride in relation to the mixed chloride concentrate product.

In some embodiments, a portion of an NF non-permeate from a segregated fully softened feed may be used as a supplemental rinse solution in cells adjacent to the electrode cells, thereby inhibiting calcium contamination of an electrode rinse solution. The return supplemental rinse solution may be recycled to the gypsum settler 114. Moreover, for seawater based brines, NF permeate may be used as a supplemental rinse solution (due to its high salt content and higher conductivity) which may be recycled back to the NF feed.

The high concentration calcium chloride brine from the intermediate output 128 is provided to the second ED unit 130 (e.g., a NaCl extraction ED) that selectively removes a substantial portion (e.g., approximately 80% to 95%) of the NaCl using monovalent permselective cation and anion membranes. In certain embodiments, the second ED unit 130 may include a two-stage ED configuration for NaCl extraction. For example, a first stage may extract approximately 70 to 90% of the NaCl as a low hardness, high concentration product concentrate. Moreover, the second stage may be fed by the first stage diluate and may produce a low NaCl, $CaCl_2$, $MgCl_2$ rich product diluate, and an intermediate concentration NaCl concentrate with higher hardness, which is recycled back to the feed of the first stage. As may be appreciated, the two-stage design may increase ED power consumption and size; however, the two-stage design may allow for a sharper separation and higher recoveries of $CaCl_2$ and $MgCl_2$ in relation to the diluate product and NaCl in relation to the concentrate product.

A NaCl brine (e.g., sodium chloride solution) is provided as an output 132 from the second ED unit 130. The NaCl brine has a low magnesium content and is provided (e.g., pumped) to an ion exchange brine softener 134 (e.g., such as an Amberlite™ IRC747 manufactured by The Dow Chemical Company of Midland, Mich.) where a substantial portion (e.g., approximately greater than 99%) of the calcium and magnesium are removed. Dilute HCl 98 is provided via an input 136 and NaOH 138 (e.g., approximately 4 wt %) is provided via an input 140 to the softener 134. The HCl 98 and the NaOH 138 are used to regenerate the ion exchange brine softener 134. The ion exchange brine softener 134 provides an output 142 of a high concentration NaCl brine 144. The high concentration NaCl brine 144 may include approximately 150 to 300 g/l NaCl. In certain embodiments, the NaCl brine 144 may be provided to the HCl and NaOH production system 66 to aid in producing HCl and NaOH. Furthermore, the NaCl brine 144 may be used to regenerate a second ion exchange softener 162, such as in brackish water feed brines. Moreover, the NaCl brine 144 may be used to produce a high purity salt for a chlor alkali plant, bleach plant, mixed oxidant plant, other chemical and industrial uses, and/or for any suitable purpose. As illustrated, a purge stream may provide the NaCl brine 144 to the second ED unit 130. The pH of the purge stream may be controlled to approximately 2.5 by HCl 98 injection, thereby converting residual fluoride to hydrogen fluoride (HF) and inhibiting fluorite scaling or NaCl brine contamination with fluoride. In certain embodiments, RO permeate or other low sulfate, low silica, low boric acid containing water may be added to prevent gypsum scaling if there is significant leakage of sulfate through the monovalent anion permselective membrane in the first ED unit 126. A low volume softener reject stream containing the calcium and magnesium may be provided by an output 146 and recycled directly to the settler 114 of the gypsum removal system 112.

The second ED unit 130 produces a concentrated $CaCl_2$, $MgCl_2$ brine stream low in NaCl (e.g., mineral solution) that is provided via an output 148. The output 148 is recirculated to the first ED unit 126 to aid in further extraction of the NaCl and the production of the high concentration NaCl brine 144. Furthermore, the output 148 is provided to a magnesium hydroxide removal system 150. As illustrated, the ED system 124 is fluidly coupled to the magnesium hydroxide removal system 150. In some embodiments (e.g., brackish water), the brine stream may contain approximately 500 to 2,000 wppm $SO_4$ and/or approximately 500 to 2000 wppm Mg, while in other embodiments (e.g., seawater), the brine stream may contain approximately 1,500 to 4,000 wppm $SO_4$ and/or approximately 600 to 2500 wppm Mg. Furthermore, the brine stream may have a pH of approximately 6. Moreover, the brine stream may include approximately 40 to 60 g/l TDS. In certain embodiments, the magnesium hydroxide removal system 150 may include a mixer (e.g., mixer 113), a settler (e.g., settler 114), and a filter (e.g., filter 115) to facilitate removal of the magnesium hydroxide from the concentrated $CaCl_2$, $MgCl_2$ brine stream (e.g., feed stream). In some embodiments, the magnesium hydroxide removal system 150 may be configured to remove approximately 90 to 98% of Mg from the brine stream.

The low NaCl concentrated $CaCl_2/MgCl_2$ product brine from the ED system 124 is enriched in magnesium and lean in sulfate due to the upstream gypsum removal system 112, and the ED system 124. In certain embodiments, the brine provided to the output 148 may be approximately 1 to 15% of the brine stream 30 provided to the mineral removal system 32. The lime based material 40 (e.g., lime, dolomitic lime, etc.) is provided to the magnesium hydroxide removal system 150 via an input 152 to precipitate magnesium hydroxide. A similar arrangement to the gypsum removal system 112 (e.g., mixer 113, settler 114, filter 115, etc.) may be used to produce a washed magnesium hydroxide filter cake and a low magnesium effluent brine. A portion of the magnesium hydroxide removal system 150 effluent may be used to produce a slaked lime slurry to facilitate lime mixing with the $CaCl_2/MgCl_2$ ED product brine. In addition to the lime based material 40, excess NaOH 138, such as from the HCl and NaOH production system 66, may be provided to the magnesium hydroxide removal system 150 via an input 154, thereby facilitating a reduction in the lime based material 40 and/or reducing the $CaCl_2$ export for brines with high (Ca+Mg) to $SO_4$ molar feed ratios (e.g., where the ratio of (Ca+Mg) to $SO_4$ is greater than approximately 1.0).

Overflow from a settler of the magnesium hydroxide removal system 150 may provide an output 155 of concentrated $CaCl_2$ brine that is recycled back to the gypsum removal system 112. The $CaCl_2$ in the brine combines with sulfate in the primary gypsum settler 114 to facilitate precipitation of gypsum 46. In certain embodiments, the output 155 may have a pH of approximately 10. The magnesium hydroxide removal system 150 outputs magnesium hydroxide slurry 156 via an output 158. In certain embodiments, the magnesium hydroxide slurry 156 may include greater than approximately 98 wt % magnesium oxide (MgO) on a calcinated basis.

Returning to the first ED unit 126, the first ED unit 126 provides an ED dilute stream (e.g., a substantially sulfate hardness free sodium sulfate solution) to an output 160. Moreover, for low salinity brackish water feeds (e.g., NaCl less than approximately 10 g/l) provided to the mineral removal system 32, the ED diluate stream from the first ED unit 126 has a TDS content of less than approximately 7 g/l (e.g., 5 g/l). Accordingly, as illustrated, the ED diluate stream from the first ED unit 126 is provided to a strong acid cation (SAC) ion exchange softener 162. The lower TDS content of the ED diluate stream enables the use of SAC ion exchange softening resins which are regenerated using NaCl brine 144, as discussed previously. The SAC ion exchange softener 162 exchanges calcium and magnesium ions in the ED diluate stream for sodium and inhibits gypsum scaling in a downstream NF system 164 that receives an output 166 from the SAC ion exchange softener 162. As illustrated, a purge stream of the NaCl brine 144 may be provided to the NF system 164 in conjunction with the output 166 to facilitate descaling.

All or part of the ED diluate stream is routed to the SAC ion exchange softener 162 based a scaling potential of the NF system 164. Relatively high sulfate hardness levels in the SAC softener effluent 166 (e.g., approximately 10-100 ppm) are used to minimize brine consumption. SAC ion exchange softener 162 resins are regenerated using the NaCl brine 144, and the spent brine from regeneration containing mainly $CaCl_2$ and $MgCl_2$ with residual NaCl is routed to the second ED unit 130, thereby facilitating recycling of the residual NaCl for producing the concentrated CaCl2, MgCl2 brine low in NaCl suitable for feed to the magnesium hydroxide removal system 150. As may be appreciated, for seawater based NF brines or high salinity feed brines, softening is not required to inhibit gypsum scaling in the downstream NF system 164. This is because the elevated NaCl content in the NF feed and non-permeate increases the gypsum solubility, thereby inhibiting scaling in the NF unit.

The ED diluate stream from the first ED unit 126, which has been optionally softened by the SAC ion exchange softener 162 is routed to the NF system 164 via outputs 160 and/or 166. In certain embodiments, approximately 60 to 80% of the ED diluate stream permeates the NF. The remaining 20 to 40% NF non-permeate contains substantially all of the sulfate, approximately 60 to 90% of the calcium, approximately 80 to 90% of the magnesium, and approximately 20 to 50% of the NaCl. Thus, a non-permeate stream output from the NF system 164 via output 168 is slightly supersaturated with respect to gypsum 46 (e.g., 1.6 saturation index defined as ion product/Ksp, which corresponds to a dissolved gypsum content of 125% of saturation). Significant scaling does not occur on the NF membranes of the NF system 164 because the kinetics of gypsum crystallization are slow in the NF membranes (e.g., no seed crystals, acidic pH, low mixing turbulence, etc.).

Periodically (e.g., approximately every 6-8 hours) a slug of high purity NaCl brine (e.g., 100-200 g/l NaCl, less than 50 ppm Ca, less than 20 ppm SO4) is injected individually into each NF element of the NF system 164. This may result in a brief (e.g., 30 second) period of reverse flow across the NF membrane in a direct osmosis, high salinity process. The high purity NaCl brine directs the gypsum microcrystals to be removed from the surface of the NF elements and dissolved in the NaCl brine, thereby inhibiting long term growth of gypsum scale since the seed microcrystals are removed before scaling kinetics can accelerate. The supersaturated NF non-permeate containing substantially all of the sulfate is recycled to the settler 114 of the gypsum removal system 112 via the output 168. In certain embodiments, the supersaturated NF non-permeate may contain approximately 8,000 to 12,000 wppm $SO_4$, approximately 300 to 500 wppm Ca, approximately 100 to 300 wppm Mg, approximately 0.8 to 1.5 g/l NaCl, and/or approximately 15 to 25 g/l TDS.

An NF permeate stream is provided via an output 170 from the NF system 164. For low salinity brackish water brine feeds the NF permeate stream may have a low TDS and thereby may meet EPA drinking water standards. Furthermore, as may be appreciated, NF membranes with increased NaCl removal may be desirable to produce drinking water with lower TDS content. It should be noted that the selection of the NF membrane may be made so that silica concentration and scaling does not occur on the NF membrane with high NaCl removal.

As illustrated, the NF permeate stream from output 170 is provided to the HCl and NaOH production system 66. The HCl and NaOH production system 66 is used to produce one or more HCl 98 outputs 172 and/or to produce one or more NaOH 138 outputs 174. Furthermore, the NF permeate stream from output 170 may be provided to the first heat exchanger 92 to facilitate heat transfer from the brine stream 30 to the NF permeate. Moreover, the NF permeate stream from output 170 may be provided to a cooling tower 176 where the NF permeate stream is cooled before flowing through the third heat exchanger 96 to facilitate heat transfer from the brine stream 30 to the NF permeate. As illustrated, the cooling tower 176 may also provide a portion of the NF permeate stream to the brine stream 30.

As may be appreciated, arsenic (e.g., as arsenite) in the brine stream 30 (e.g., from brackish groundwater treatment) may pass through the gypsum removal system 112 and the NF system 164, thereby ending up in the NF permeate stream from the output 170. Accordingly, in certain embodiments, the arsenic is not removed by NF membranes. If necessary to meet drinking water standards the arsenic may be removed from the NF permeate stream using an arsenic absorber 178. Within the arsenic absorber 178, the NF permeate stream is chlorinated with chlorine, sodium hypochlorite, and/or mixed oxidant 180 received via an input 182 thereby converting the arsenite to arsenate. The stream is then routed to a granular ferric hydroxide (GFH) or granular ferric oxide (GFO) absorption bed where the arsenate is absorbed and chemically sequestered as non-leachable ferric arsenate. Periodically the spent GFH or GFO may be removed and/or stored onsite for future arsenic reclaiming Moreover, fresh GFH or GFO may be provided into the absorption beds. The absence of essentially all the sulfate and chloride in the NF permeate water along with its slightly acidic pH (e.g., approximately 5 to 6), make the GFH or GFO absorption of arsenic highly efficient and cost effective. The desalinated water 28 is provided by an output 184 from the arsenic absorber 178. While the arsenic absorber 178 is included in the illustrated embodiment, other embodiments may not include the arsenic absorber 178. In certain embodiments, the desalinated water 28 may contain approximately 50 to 150 mg/l $SiO_2$, approximately 10 to 50 mg/l Ca+Mg, approximately 0.3 to 0.9 g/l NaCl, and/or approximately 500 to 1000 ppm TDS.

In certain embodiments, a slipstream of the softened ED diluate stream from the first ED unit 126 may be routed to a biological or chemical selenium removal system 186. The selenium may be concentrated in this stream because it typically exists as selenate which has similar properties to sulfate. Moreover, the selenium does not permeate NF or anion monovalent permselective ED membranes and is more soluble than sulfate in the presence of calcium. Thus, the low NaCl, sulfate, $MgCl_2$ and $CaCl_2$ concentration in the ED diluate stream provide optimal conditions for the chemical or biological removal processes. For example, in certain embodiments, the ED diluate stream may contain approximately 3,000 to 5,000 wppm $SO_4$, approximately 100 to 150 wppm Ca, approximately 25 to 75 wppm Mg, and/or approximately 0.5 to 1.0 g/l NaCl. The selenium removal system 186 is configured to remove selenium from the ED diluate stream, to provide selenium 188 from a first output 190, and to provide a substantially selenium free ED diluate stream to the NF system 164.

Figure 3:
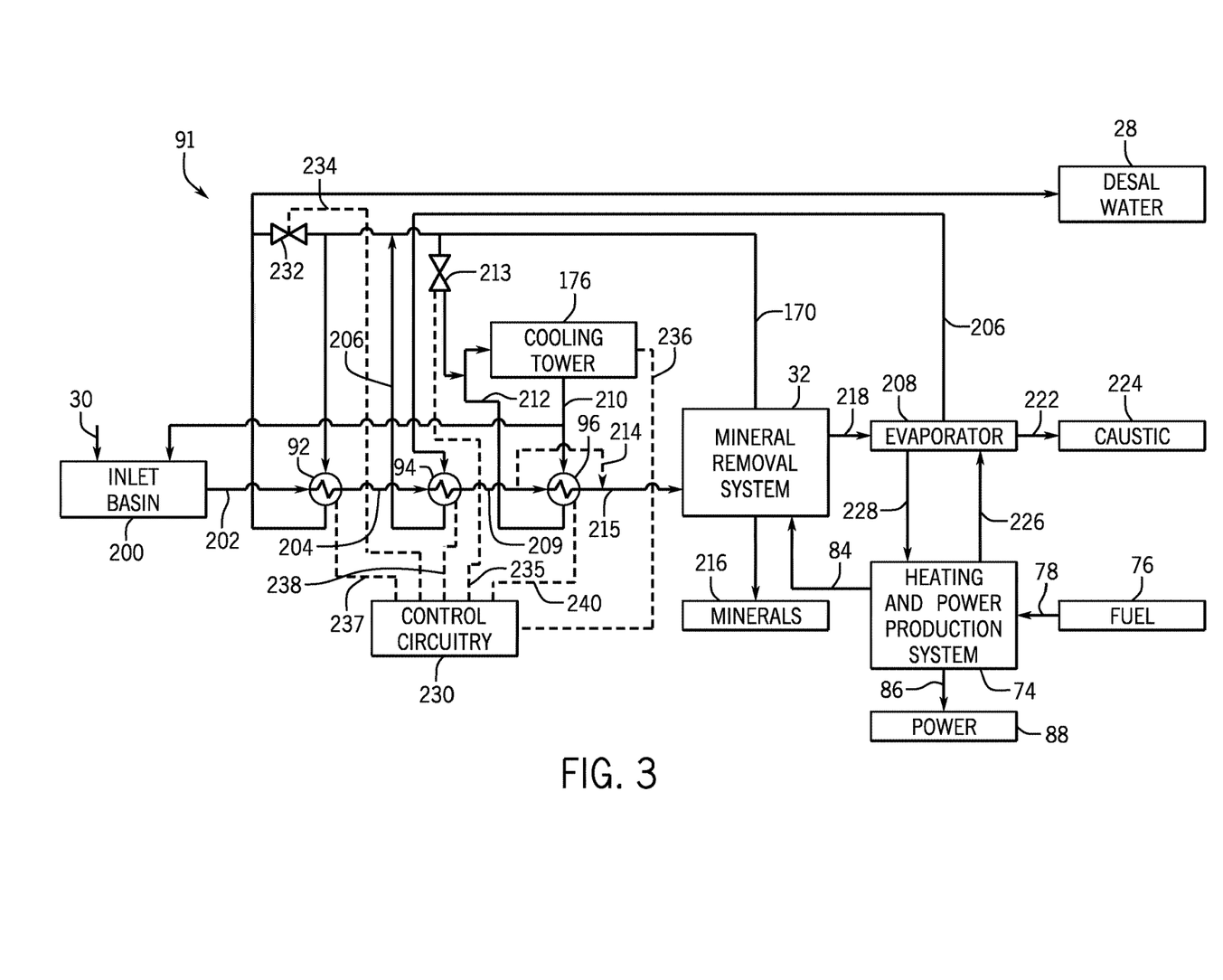
FIG. 3 is a block diagram of an embodiment of a temperature control system for controlling a temperature of a brine stream provided to a mineral removal system, in accordance with aspects of the present disclosure.

FIG. 3 is a block diagram of an embodiment of the temperature control system 91 for controlling a temperature of the brine stream provided to the mineral removal system 32, such as the brine stream from the output 30 of the RO system 20. As illustrated, an inlet storage basin 200 receives the brine stream from the output 30 of the RO system 20. In other embodiments, the inlet storage basin 200 may receive any suitable brackish water, brackish water reverse osmosis brine, and/or seawater. Moreover, in certain embodiments, the inlet storage basin 200 may receive approximately 2-5 million gallons per day (MGD) from the brine stream. For embodiments in which the brine stream is greater than approximately 90 degrees Fahrenheit (° F.), the water from the brine stream may be contained within the inlet storage basin 200 for a sufficient period of time to facilitate cooling of the water to approximately 90° F. Moreover, during certain seasons, such as during summertime, cooling sprays may be used in the inlet storage basin 200 to increase a rate of cooling.

The brine stream is provided from the inlet storage basin 200 via an output 202. A temperature of the brine stream flowing through the output 202 may be less than or equal to approximately 90° F. For example, the temperature of the brine stream flowing through the output 202 may be within a range of approximately 60 to 90° F. If the temperature of the brine stream is below a predetermined threshold, the first heat exchanger 92 may be used to transfer heat from the desalinated water 28 provided by the mineral removal system 32 via the output 170 to the brine stream, thereby heating the brine stream. For example, if the temperature of the brine stream is less than approximately 88° F., the first heat exchanger 92 may be used to transfer heat to the brine stream. As may be appreciated, the desalinated water 28 provided by the mineral removal system 32 may be approximately 100 to 110° F. Accordingly, within the first heat exchanger 92, the desalinated water 28 may heat the brine stream to a temperature within the range of approximately 85 to 90° F. For example, the first heat exchanger 92 may heat the brine stream to a temperature of approximately 88° F. As may be appreciated, the first heat exchanger 92 may be any suitable heat exchanger, such as a counter current exchanger (e.g., a plate and frame exchanger), a shell and tube heat exchanger, a plate heat exchanger, a plate and shell heat exchanger, a plate fin heat exchanger, an adiabatic wheel heat exchanger, a pillow plate heat exchanger, a fluid heat exchanger, a waste heat recovery unit, a dynamic scraped surface heat exchanger, a phase-change heat exchanger, and so forth.

The preheated brine stream is provided via an output 204 to the second heat exchanger 94. In the illustrated embodiment, the second heat exchanger 94 uses a heated fluid (e.g., steam, vacuum steam, water, etc.) from an output 206 of an evaporator 208 to transfer heat to the preheated brine stream. In certain embodiments, the second heat exchanger 94 may use hot water from a natural gas engine heat recovery system, vacuum exhaust steam from a caustic evaporator, or any suitable heated fluid to transfer heat to the preheated brine stream. Moreover, the heated fluid may have a temperature of approximately 115 to 130° F. Accordingly, the heated fluid may transfer heat to the preheated brine stream to increase the temperature of the preheated brine stream by approximately 10 to 20° F. Therefore, the brine stream provided via an output 209 from the second heat exchanger 94 may have a temperature within a range of approximately 100 to 110° F. The second heat exchanger 94 may be any suitable heat exchanger, such as a counter current exchanger (e.g., plate and frame exchanger), a shell and tube heat exchanger, a plate heat exchanger, a plate and shell heat exchanger, a plate fin heat exchanger, an adiabatic wheel heat exchanger, a pillow plate heat exchanger, a fluid heat exchanger, a waste heat recovery unit, a dynamic scraped surface heat exchanger, a phase-change heat exchanger, and so forth.

As may be appreciated, in certain embodiments the heated brine stream output from the second heat exchanger 94 may be at a temperature of approximately 103° F. for a brine stream with an exit temperature of 80° F. or below from the inlet storage basin 200, but may be as high as approximately 115° F. for a brine stream with an exit temperature of 90° F. from the inlet storage basin 200 (e.g., during the summer, in high temperature feed brines, etc.). Therefore, the third heat exchanger 96 (e.g., a trim cooler) may be used to cool the brine stream when its temperature exceeds 103° F. In the illustrated embodiment, the cooling tower 176 is used to produce cooling water provided via an output 210. In certain embodiments, the cooling water may have a temperature of approximately 85 to 95° F. For example, the cooling water may have a temperature of approximately 90° F. As may be appreciated, the third heat exchanger 96 may also be any suitable heat exchanger, such as a counter current exchanger (e.g., a plate and frame exchanger), a shell and tube heat exchanger, a plate heat exchanger, a plate and shell heat exchanger, a plate fin heat exchanger, an adiabatic wheel heat exchanger, a pillow plate heat exchanger, a fluid heat exchanger, a waste heat recovery unit, a dynamic scraped surface heat exchanger, a phase-change heat exchanger, and so forth. Accordingly, the third heat exchanger 96 may cool the brine stream to a temperature of approximately 100 to 105° F. (e.g., approximately 103° F.). Moreover, the cooling water from the cooling tower 176 is heated within the third heat exchanger 96 by the brine stream to approximately 95 to 100° F. The cooling water is recirculated via an output 212 back to the cooling tower 176 where it is again cooled to a temperature of approximately 85 to 95° F. (e.g., approximately 90° F.).

As illustrated, the desalinated water provided via the output 170 from the mineral removal system 32 is supplied to the cooling tower 176. In other embodiments, reverse osmosis output 29 (with a low silica content) may be supplied to the cooling tower 176 to block silica scaling when the desalinated water contains high levels of dissolved silica. In certain embodiments, only a small portion (e.g., approximately less than 1%) of the desalinated water may be fed to the cooling tower 176. Furthermore, a small blowdown flow (e.g., approximately less than 0.2%) of the desalinated water is recycled to the inlet storage basin 200 from the cooling tower 176 to purge dissolved minerals from the cooling tower 176. During winter operation increased cooling may occur via the inlet storage basin 200. Accordingly, the third heat exchanger 96 and/or the cooling tower 176 may not be used. In certain embodiments, a valve 213 may be positioned to block the flow of desalinated water to the cooling tower 176. Furthermore, the brine stream may be redirected to bypass the third heat exchanger 96, as illustrated by a rerouting circuit 214.

The brine stream is provided via an output 215 from the third heat exchanger 96 to the mineral removal system 32. As discussed previously, the brine stream may have a temperature of approximately 100 to 105° F. As may be appreciated, the mineral removal system 32 may be a high yield system (e.g., approximately 80 to 100%) due at least in part to minerals 216 removed from the brine stream and/or concentrated reject or byproduct brine production. For example, in certain embodiments, a flow rate of the brine stream into the inlet storage basin 200 may be substantially the same as a flow rate of the desalinated water provided by the mineral removal system 32 via the output 170. Moreover, in certain embodiments, the flow rate of the desalinated water provided by the mineral removal system 32 may be greater than approximately 80% (e.g., approximately 80 to 100%) of the flow rate of the brine stream into the inlet storage basin 200, thus resulting in a high yield system.

In the illustrated embodiment, the mineral removal system 32 is configured to produce a caustic solution (e.g., NaOH solution) and to provide the caustic solution (e.g., having approximately 5 to 15 wt %) via an output 218 to the evaporator 208. As may be appreciated, electrodialysis bipolar membrane (EDBM) technology may be used to produce a dilute caustic stream, and a dilute hydrochloric acid stream. The hydrochloric acid stream may be used within the mineral removal system 32 (e.g., carbonate conversion to $CO_2$ for removal in the air stripper 100, brine softener 134 regeneration, etc.). However, there may be more caustic produced by the mineral removal system 32 than is used by the mineral removal system 32. Accordingly, the evaporator 208 may evaporate the caustic solution to produce an output 222 of caustic solution 224 having approximately 30 to 50 wt %. Such a caustic solution may be economically transported and/or sold as industrial grade caustic.

The evaporator 208 (e.g., a plate and frame evaporator) may operate under vacuum using hot water received from the heating and power production system 74 via an input 226 of the evaporator 208. The hot water received from the heating and power production system 74 may have a temperature of approximately 160 to 200° F. Using the hot water, the evaporator 208 may in certain embodiments concentrate the caustic from approximately 10 wt % to approximately 30 wt %. As the hot water is cooled, the water is returned from the evaporator 208 to the heating and power production system 74 via an output 228 of the evaporator 208. Vacuum steam vapor from the caustic evaporator 208 may be provided via the output 206 to the second heat exchanger 94 to heat the brine stream. As the vacuum steam vapor exits the evaporator 208, the vacuum steam vapor may have a temperature of approximately 120 to 140° F. (e.g., 130° F.). Accordingly, as the vacuum steam vapor passes through the second heat exchanger 94, the vacuum steam vapor is condensed.

In certain embodiments, the temperature control system 91 may include control circuitry 230 (e.g., electronic controls, valving, pneumatic controls, hydraulic controls, etc.) to control the temperature of the brine stream flowing into the mineral removal system 32. For example, the control circuitry 230 may be used to control a bypass valve 232 using control lines 234 for directing some of the warm desalinated water around the first heat exchanger 92. Moreover, the control circuitry 230 may be used to control the valve 213 using control lines 235 that control the flow of desalinated water to the cooling tower 176. As another example, the control circuitry 230 may be used to control a flow of the cooling water from the cooling tower 176 to the third heat exchanger 96 using control lines 236. In certain embodiments, the control lines 236 may also be used to control a fan speed on the cooling tower 176 to control a temperature of the cooling water (e.g., to change ambient operating conditions).

Furthermore, control lines 237, 238, and 240 may be used to control and/or monitor various aspects of the first, second, and/or third heat exchangers 92, 94, and 96. Specifically, the control lines 237, 238, and 240 may be used to monitor an entry and/or an exit temperature of the fluids flowing through the heat exchangers 92, 94, and 96. Moreover, the control lines 237, 238, and 240 may be used to control valves and/or any other features of the heat exchangers 92, 94, and 96. For example, the control lines 237, 238, and 240 may be used to direct the brine stream to bypass one or more of the heat exchangers 92, 94, and 96. Accordingly, the control circuitry 230 may be used to monitor temperatures and/or control a temperature of the brine stream provided to the mineral removal system 32. For example, in certain embodiments, a temperature of the brine stream may be maintained at a temperature of approximately 103° F., thereby enabling the mineral removal system 32 to operate at a desired temperature.

Figure 4:
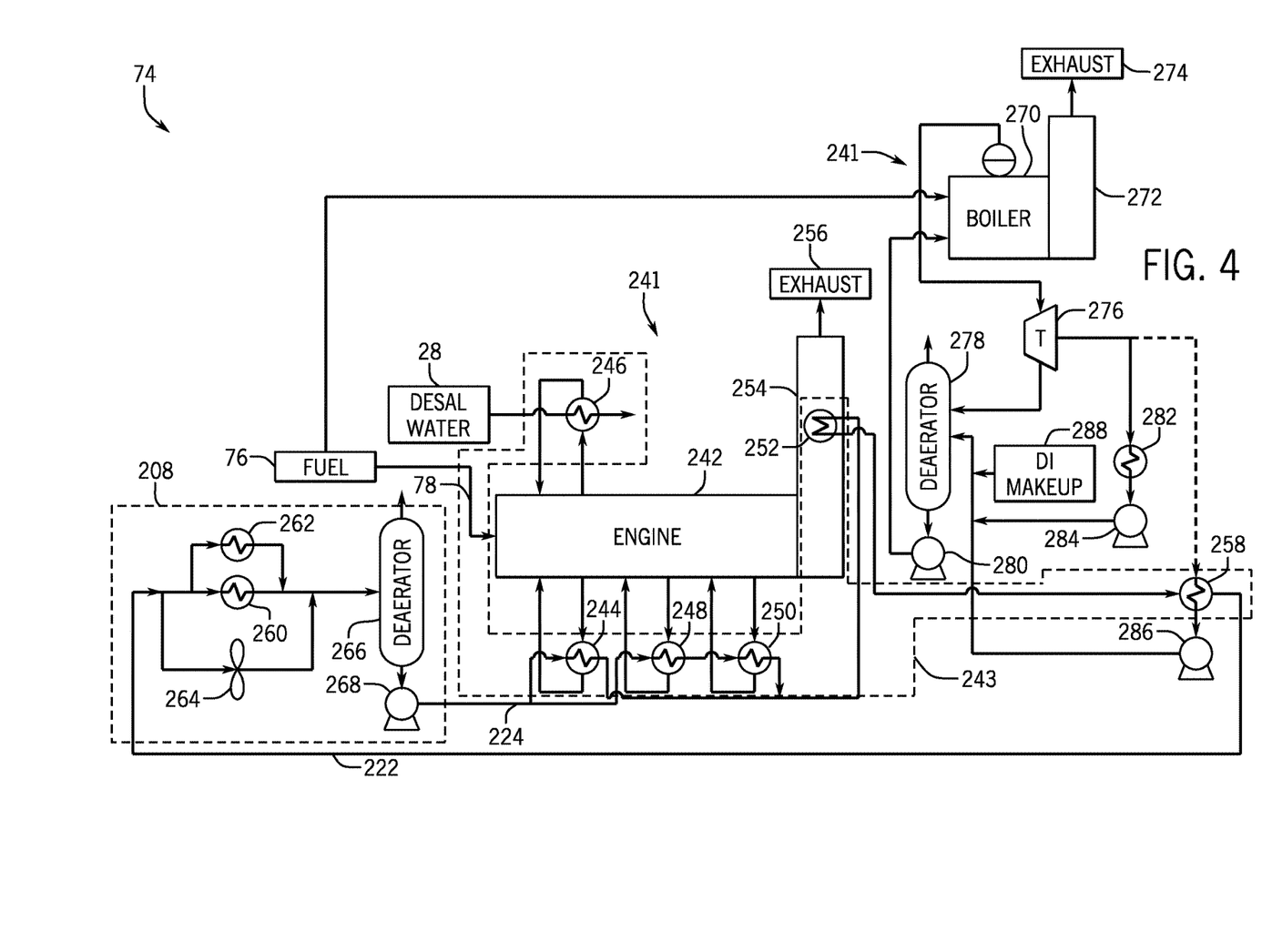
FIG. 4 is a block diagram of an embodiment of a heating and power production system, in accordance with aspects of the present disclosure.

FIG. 4 is a block diagram of an embodiment of the heating and power production system 74. As may be appreciated, in an illustrative example the mineral removal system 32 may consume approximately 9 kwh/m3 of power to desalinate and/or extract other minerals from a brine stream and may use approximately 10-12 kwh/m3 of heat to heat the brine stream 15 to 20° F. If energy intensive evaporators and electrodialysis units utilize brine storage tanks and are generally operated only at off-peak times (e.g., 18 hours per day) then the power consumption may increase to approximately 12 kwh/m3 during off-peak time periods and may be reduced to approximately 2 kwh/m3 during on-peak time periods. In such configurations, peak power export may be enabled by such operation. A power production profile as described matches the heat and power production profile of certain natural gas engines (e.g., GE Jenbacher J624 produced by General Electric of Atlanta, Ga. produces 4400 kw of power and 4100 kw of heat). As another example, a mineral removal system 32 having a flow rate of approximately 367 m3/h (e.g., 2.3 MGD) may consume approximately 4400 kw (e.g., 12 kwh/m3) of power and approximately 4100 kw (e.g., 11 kwh/m3) of heat during off-peak operation. Furthermore, such a mineral removal system 32 may consume approximately 734 kw (e.g., 2 kwh/m3) of power during peak conditions (e.g., and may export approximately 3666 kw) and consume approximately 4100 kw (e.g., 11 kwh/m3) of heat during peak operation.

In the illustrated embodiment, the heating and power production system 74 includes a power production system 241 having an engine 242. In certain embodiments, the engine 242 is a high efficiency natural gas engine 242 (e.g., GE Jenbacher J624 or J920) used to produce power and hot water using the fuel 76 (e.g., natural gas fuel). Moreover, in the illustrated embodiment, the engine 242 does not include combined cycle power production. As may be appreciated, the size and/or number of engines may be selected to match an off-peak power requirement (e.g., maximum power consumption) of the mineral removal system 32. In certain embodiments, the engine 242 may be designed to produce approximately 3.0 to 3.5 MW of power. The hot water heat produced from these high efficiency engines may match the brine stream heat requirements. Moreover, any suitable engine may be used to produce power and provide heat for operating the mineral removal system 32. For example, a larger engine than those described above may be used with export power if insufficient heat is available to meet the minimum brine stream heat requirement of approximately 9 kwh/m3. Furthermore, a smaller engine with a small amount of off-peak import power may be used if the engine exceeds the maximum brine stream heat requirement of approximately 12 kwh/m3. A smaller engine with a supplemental boiler and/or hot water heater may be used if low cost off-peak power (e.g., surplus local wind power) is available. Multiple engines or a backup boiler may also be used to increase the reliability of heat supply to the mineral removal system 32.

In certain embodiments, the natural gas engine 242 may be operated at a base load, producing a fixed amount of power and heat. Moreover, the brine stream flow to the mineral removal system 32 is operated at a fixed rate and brine stream temperature. If desired, high power consuming brine concentration and conversion units (e.g., electrodialysis, mechanical vapor recompression crystallizers, electrodialysis bipolar membrane caustic, hydrochloric acid production, mixed oxidant membrane units, etc.) may be operated only during off-peak time periods using feed brine and product brine storage tanks. Thus, off-peak power demand may be increased, thereby enabling high value on-peak power for export. This mode of operation also enables additional local wind capacity to be used because the mineral removal system 32 may be switched from mineral production to export power production whenever wind power is unavailable.

A heating system 243 of the heating and power production system 74 includes various heat exchangers that may be used by the engine 242 to cool the engine 242 and to transfer heat to other fluids to use heat produced by the engine 242. For example, the heating system includes a first stage heat exchanger 244 that is used to transfer heat from a first fluid flowing through the first stage of the engine 242 to a second fluid (e.g., water) flowing into the input 224 of the heating and power production system 74. In certain embodiments, the first fluid flowing from the first stage of the engine 242 may have a temperature of approximately 180 to 190° F. Moreover, the second fluid may enter the first stage heat exchanger 244 with a temperature of approximately 150 to 170° F.

The heating system 243 includes a second stage heat exchanger 246 that is used to transfer heat from a third fluid flowing through the second stage of the engine 242 to the desalinated water 28. In certain embodiments, the third fluid flowing from the second stage of the engine 242 may have a temperature of approximately 115 to 125° F. Furthermore, the heating system 243 includes a lube oil heat exchanger 248 that is used to transfer heat from oil in an oil system of the engine 242 to the second fluid. In certain embodiments, the oil may have a temperature of approximately 170 to 180° F. Moreover, the heating system 243 includes an engine heat exchanger 250 that is used to transfer heat from a fourth fluid flowing from the engine 242 to the second fluid. In certain embodiments, the fourth fluid may have a temperature of approximately 200 to 210° F.

The heating system 243 also includes a stack heat exchanger 252 that is positioned in an exhaust stack 254 of the engine 242 to facilitate heat transfer from exhaust 256 that flows through the exhaust stack 254 to the second fluid. In certain embodiments, the exhaust 256 may enter the stack heat exchanger 252 with a temperature of approximately 850 to 950° F., and the exhaust 256 may exit the stack heat exchanger 252 with a temperature of approximately 220 to 300° F. Moreover, the second fluid may exit the stack heat exchanger 252 with a temperature of approximately 200 to 250° F. The second fluid flows from the stack heat exchanger 252 to a backup heat exchanger 258 of the heating system 243 where heat may be exchanged with another fluid. The second fluid is then provided to the output 222 of the heating and power production system 74.

As illustrated, the second fluid is provided to the evaporator 208 (e.g., caustic evaporator). Within the evaporator 208, heat is transferred from the second fluid to a caustic solution and/or a caustic regenerator via a first heat exchanger 260 (e.g., stage 1 caustic evaporator) and a second heat exchanger 262 (e.g., caustic regeneration heater). In certain embodiments, such as when heat is not being transferred to the caustic solution and/or the caustic regenerator, a fan 264 (e.g., trim airfan, backup airfan, etc.) may be used to transfer heat from the second fluid. As illustrated, the second fluid flows to a deaerator 266 where air is removed from the second fluid (e.g., via purge nitrogen, vacuum pump, etc.), then the second fluid is directed using a pump 268 to return to the heating and power production system 74.

In the illustrated embodiment, the fuel 76 (e.g., natural gas) may be provided to a boiler 270 of the power production system 241. The boiler 270 may be used to heat fluids for use within the mineral removal system 32. In certain embodiments, heat produced within an exhaust stack 272 by exhaust 274 flowing from the boiler 270 may be used for transferring heat to another fluid. Moreover, steam produced by the boiler 270 is provided to a steam turbine 276. In certain embodiments, the steam provided by the boiler 270 to the steam turbine 276 may have a temperature of approximately 800 to 850° F., and the steam may have a pressure of approximately 1000 to 1500 psig. Moreover, the steam turbine 276 may be configured to produce approximately 0.1 to 1.5 MW of power. The steam turbine 276 provides steam to a deaerator 278. For example, the steam turbine 276 may provide saturated steam having a pressure of approximately 40 to 60 psig.

The deaerator 278 is configured to remove air from the steam and other inputs and to provide deaerated fluid to a pump 280 that facilitates returning the fluid to the boiler 270. Moreover, a portion of steam from the steam turbine 276 is also provided to a heat exchanger 282 (e.g., stage 2 caustic evaporator) of the heating system 243 in which heat may be transferred from the steam to a caustic solution. The steam provided to the heat exchanger 282 may be saturated steam having a pressure of approximately 2 to 8 psig. A pump 284 directs the output from the heat exchanger 282 to the deaerator 278. Moreover, the steam turbine 276 may also provide steam to the backup heat exchanger 258. Fluid exiting the backup heat exchanger is directed to the deaerator 278 using a pump 286. As illustrated, deionized makeup water 288 may be added to the system via the deaerator 278.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a desalination system comprising:
      a reverse osmosis system configured to receive a first brine stream comprising minerals and to produce a second brine stream and a first desalinated water stream from the first brine stream, wherein the second brine stream comprises the minerals from the first brine stream;
      a mineral removal system disposed downstream from and fluidly coupled to the reverse osmosis system, wherein the mineral removal system is configured to receive the second brine stream and to capture the minerals from the second brine stream to generate a second desalinated water stream, and wherein the mineral removal system comprises a nanofiltration system configured to generate the second desalinated water stream;
   at least one electrodialysis system disposed within the mineral removal system, wherein the at least one electrodialysis system is positioned upstream from and fluidly coupled to the nanofiltration system;
   a power production system comprising an engine configured to provide power to the desalination system, wherein the power production system does not include combined cycle power production; and
   a heating system disposed between the reverse osmosis system and the mineral removal system, wherein the heating system is configured to heat the second brine stream upstream of the mineral removal system, and the power production system provides heat to the heating system to heat the second brine stream.

2. The system of claim 1, comprising a temperature control system configured to control a temperature of the second brine stream using the heat of the heating system.

3. The system of claim 2, wherein the temperature control system comprises a first heat exchanger and a second heat exchanger.

4. The system of claim 3, wherein the temperature control system is configured to flow a fluid through the first heat exchanger, the second heat exchanger, or a combination thereof.

5. The system of claim 3, wherein the temperature control system is configured to direct a heated fluid to bypass the first heat exchanger, the second heat exchanger, or a combination thereof.

6. The system of claim 3, wherein the nanofiltration system is configured to direct a portion of the second desalinated water stream through the first heat exchanger.

7. The system of claim 1, comprising a cooling tower fluidly coupled to a trim cooler and configured to output a cooled fluid.

8. The system of claim 7, wherein the nanofiltration system is configured to direct a portion of the second desalinated water stream to the cooling tower.

9. The system of claim 1, comprising a caustic evaporator configured to receive the heat of the heating system.

10. The system of claim 1, wherein a first flow rate of the second brine stream is substantially the same as a second flow rate of the second desalinated water stream.

11. A system comprising:
    a desalination system comprising:
       a reverse osmosis system configured to receive a first brine stream comprising minerals and to produce a second brine stream and a first desalinated water stream from the first brine stream, wherein the second brine stream comprises the minerals from the first brine stream;
       a mineral removal system disposed downstream from and fluidly coupled to the reverse osmosis system, wherein the mineral removal system is configured to receive the second brine stream and to capture the minerals from the second brine stream to generate a second desalinated water stream, and wherein the mineral removal system comprises an electrodialysis system and a nanofiltration system disposed downstream from and fluidly coupled to the electrodialysis system, wherein the nanofiltration system is configured to generate the second desalinated water stream; and
    a temperature control system comprising a first heat exchanger fluidly coupled to the nanofiltration system and configured to heat the second brine stream using the second desalinated water stream before the second brine stream is provided to the mineral removal system, wherein the temperature control system is configured to control a temperature of the second brine stream at least partly by selectively directing the second desalinated water stream to bypass the first heat exchanger.

12. The system of claim 11, wherein a first flow rate of the second brine stream is substantially the same as a second flow rate of the second desalinated water stream.

13. The system of claim 11, wherein the temperature control system comprises a second heat exchanger configured to heat the second brine stream using a heated fluid.

14. A system comprising:
    a desalination system comprising a reverse osmosis system configured to receive a first brine stream and to produce a first desalinated water stream and a second brine stream from the first brine stream;
    a mineral removal system comprising an electrodialysis system and a nanofiltration system disposed downstream from and fluidly coupled to the electrodialysis system, wherein the nanofiltration system is configured to generate a second desalinated water stream from at least a portion of the second brine stream; and
    a temperature control system fluidly disposed between the reverse osmosis system and the mineral removal system, wherein the temperature control system is configured to heat the second brine stream using the second desalinated water stream before the second brine stream is provided to the mineral removal system, a first flow rate of the second desalinated water stream is greater than or equal to approximately 80 percent of a second flow rate of the second brine stream.

15. The system of claim 14, comprising a heating system configured to provide heat for heating the second brine stream.

16. The system of claim 14, comprising a power production system configured to produce power for operating the desalination system.

17. The system of claim 1, wherein the mineral removal system does not comprise a reverse osmosis system.

18. The system of claim 1, comprising a hydrogen chloride (HCl) and sodium hydroxide (NaOH) production system disposed downstream from and fluidly coupled to the mineral removal system, wherein the HCl and NaOH production system is configured to receive at least a portion of the second desalinated water stream from the nanofiltration system.

19. The system of claim 1, comprising an ion exchange softener disposed within the mineral removal system, wherein the ion exchange softener is positioned between and fluidly coupled to the at least one electrodialysis system and the nanofiltration system, wherein the ion exchange softener is configured to receive a diluate stream from the at least one electrodialysis system, to generate a softened stream from the diluate stream, and to direct the softened stream to the nanofiltration system.

\* \* \* \* \*